United States Patent [19]

Ottemann

[11] 3,915,032

[45] Oct. 28, 1975

[54] INTER-AXLE DIFFERENTIAL LOCK

[75] Inventor: William C. Ottemann, Union Lake, Mich.

[73] Assignee: Eaton Corporation, Cleveland, Ohio

[22] Filed: June 12, 1973

[21] Appl. No.: 369,354

[52] U.S. Cl. .................................................. 74/711
[51] Int. Cl.² ............................................... F16H 1/44
[58] Field of Search ............ 74/711, 710.5, 713, 64; 192/103 C, 35

[56] References Cited
UNITED STATES PATENTS

| | | | |
|---|---|---|---|
| 2,431,272 | 11/1947 | Mynssen et al. | 74/711 |
| 2,884,808 | 5/1959 | Mueller | 74/710.5 X |
| 3,089,349 | 5/1963 | Thornton | 74/710.5 |
| 3,265,173 | 8/1966 | Russell | 74/710.5 X |
| 3,396,609 | 8/1968 | Stockton | 74/711 |
| 3,437,186 | 4/1969 | Roper | 74/711 X |
| 3,452,619 | 7/1969 | Roper | 74/711 |
| 3,489,038 | 1/1970 | Roper | 74/710.5 |
| 3,584,713 | 6/1971 | Tani et al. | 192/103 C X |
| 3,606,803 | 9/1971 | Ottemann | 74/711 |
| 3,762,241 | 10/1973 | Roper | 74/711 |
| 3,845,672 | 11/1974 | Goscenski, Jr. | 74/711 |

Primary Examiner—Samuel Scott
Assistant Examiner—Lance W. Chandler
Attorney, Agent, or Firm—Teagno & Toddy

[57] ABSTRACT

An inter-axle differential lock for a tandem drive axle vehicle. The differential is of the side gear type having an input shaft splined to a spider assembly which drives the side gear pinions or planet gears, a first output side gear or driven gear which is journaled on the input shaft, and a second output side gear or driven gear which is axially aligned with the input shaft. The input shaft also carries a positive clutch which locks the first output gear to the input shaft when an acceleration responsive clutch actuator senses a relative acceleration, above a predetermined level, between the input shaft and the first output gear. The clutch actuator is carried by the first output gear and has a drive shaft which drives a flywheel assembly. The actuator drive shaft has a pinion at one end which is in mesh with gear teeth formed on the outer periphery of one of the members of the positive clutch.

21 Claims, 5 Drawing Figures

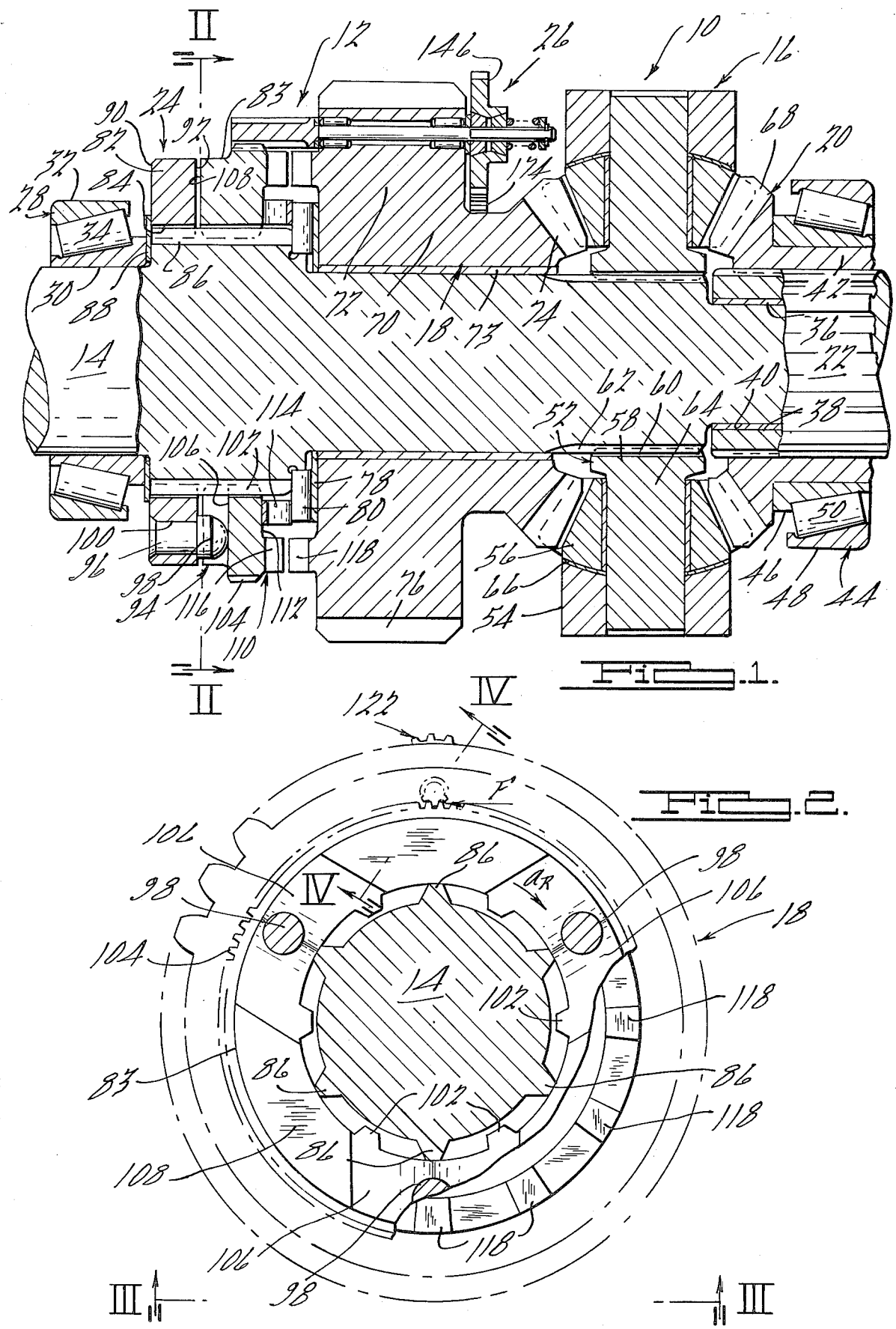

INTER-AXLE DIFFERENTIAL LOCK

FIELD OF THE INVENTION

This invention relates to differentials and, particularly, to automatic lock mechanisms for differentials.

BACKGROUND OF THE INVENTION

Prior art lock mechanisms to prevent excessive relative rotational wheel speeds between the wheels driven by a differential have been of two basic types, manually controlled mechanisms and automatically controlled mechanisms. The manually controlled mechanisms are usually employed in, but not limited to, heavy trucks and usually require a positive type clutch due to high torque loads; this type of mechanism is engaged at the discretion of the vehicle operator before the vehicle is placed in motion. The automatically controlled mechanisms are usually employed in light vehicles, such as passenger cars or pickup trucks, and usually have a friction type clutch. The clutch is automatically engaged in response, typically, to the level of relative rotation between two members of the differential or, as in one known prior art mechanism, in response to the level of acceleration of one of the members. Examples of the relative rotation responsive mechanisms are disclosed in U.S. Pat. Nos. 3,437,186 entitled "Speed Responsive Clutch" and 3,606,803 entitled "Centrifugal Actuator for Limited Slip Differential," both assigned to the assignee of the invention. The one known prior art mechanism of the acceleration responsive type is disclosed in U.S. Pat. No. 2,431,272 entitled "Self-Locking Equalizing Drive."

Manually controlled mechanisms with positive type clutches are satisfactory in that the positive clutch is capable of preventing relative rotation between the differential members even under high torques; however, these mechanisms require the attention of the vehicle operator and, if inadvertently left engaged, may accelerate tire wear and cause vehicle instability on slippery roads or damage to the differential or axial assembly on dry roads during normal turning.

Automatically controlled mechanisms of the relative rotation responsive type operate satisfactorily with friction type clutches in light vehicles; however, since this type of mechanism responds to engage the clutch when the relative rotation exceeds a predetermined level, the use of a positive type clutch in combination with a relative rotation responsive mechanism would be impractical due to high shock loads upon engagement of the clutch.

The acceleration responsive mechanism disclosed in U.S. Pat. No. 2,431,272 is basically a mass of predetermined moment of inertia which is threaded to an output shaft of a differential. Angular acceleration of the mass is responsive to angular acceleration of the shaft and the angular acceleration of the mass is limited by the frictional forces at the thread interface of the mass and the shaft. This type of arrangement is responsive to acceleration of the shaft and not relative acceleration between members of the differential. Furthermore, levels of angular acceleration of the shaft, even though they may be due to a slipping wheel, may be too low to produce a force exceeding the frictional force between the thread interface of the mass and the shaft. When this phenomena occurs the mass will not be displaced axially on the threads and the clutch will not engage, even though the wheel on the shaft is slipping and accelerating to a spin level which prevents effective driving torque being applied to the non-slipping wheel.

SUMMARY

A primary objective of the present invention is to provide an automatic lock mechanism for a differential which overcomes the noted disadvantages of the prior art units.

A more specific object is to provide an automatic lock mechanism which is more responsive to incipient wheel spin than prior art units.

A still more specific object is to provide an automatic lock mechanism which is more responsive to low levels of incipient relative rotation between two members of the differential.

A further object is to provide an automatic lock mechanism having a higher torque load capacity than prior art automatic lock mechanisms.

The differential of the present invention is of the type including an input member and two output members. According to an important feature of the invention, the differential is provided with a lock mechanism which operates in response to sensed relative acceleration between members of the differential to restrict relative rotation between these members. This arrangement allows wheel spin conditions to be detected and corrected at an incipient, relatively innocuous stage.

According to another feature of the invention, the lock mechanism includes a clutch, and an actuator which operates in response to relative acceleration between the members to move the clutch to a position in which it restricts relative rotation between the members.

According to another feature of the invention, the actuator operated clutch is of the positive engagement type, and the actuator includes a torque limiting clutch which functions to limit the magnitude of the reverse forces generated upon engagement of the positive clutch.

According to another feature of the invention, the actuator is drivingly connected between two members of the differential and the driving connection is arranged to amplify the relative acceleration between the members, whereby a relatively small relative acceleration generates a force sufficient to actuate the positive clutch. In the disclosed embodiment of the invention, the actuator includes a shaft journaled in an output member of the differential, the positive clutch is concentric to and driven by an input shaft member of the differential, and a set of gear teeth formed on a member of the positive clutch meshes with a pinion formed on an end of the actuator shaft.

BRIEF DESCRIPTION OF THE DRAWINGS

In the drawings:

FIG. 1 is a cross-sectional view of an inter-axle differential provided with a lock mechanism according to the invention;

FIG. 2 is a cross-sectional view taken on line II—II of FIG. 1.

DESCRIPTION OF THE PREFERRED EMBODIMENT

Figure 4:
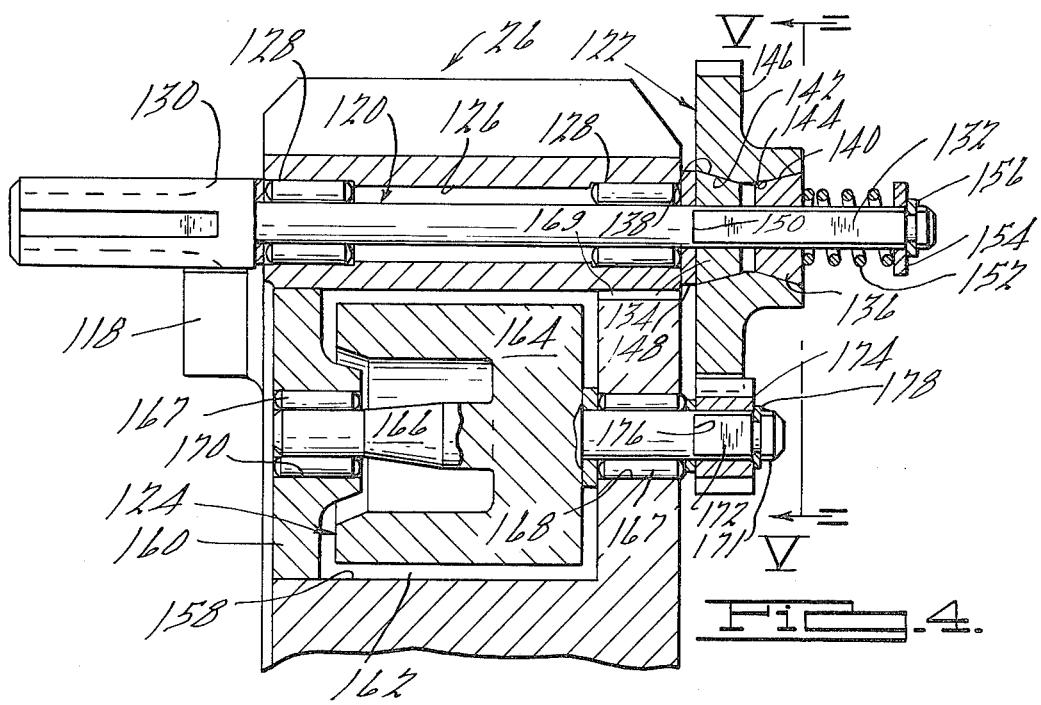
FIGS. 3 and 4 are cross-sectional views taken on lines III—III and IV—IV, respectively, of FIG. 2.

FIG. 1 illustrates an inter-axle differential 10 having a lock mechanism 12. Although differential 10 is intended primarily for use in a heavy truck having tandem drive axles, the invention lock mechanism is not limited to use in heavy trucks or in combination with inter-axle differentials. Broadly considered, differential 10 includes an input shaft 14, a spider assembly 16, driven members 18 and 20, and an output shaft 22. Lock mechanism 12 includes a positive type clutch assembly 24 and an acceleration responsive actuator assembly 26.

Input shaft 14 is supported for rotation at its forward end by a tapered roller bearing 28 having inner and outer races 30, 32 and a plurality of rollers 34. Bearing 28 may be supported in a housing assembly (not shown) in a well-known manner; the rearward end of input shaft 14 is supported within a sleeve bearing 36. Sleeve bearing 36 is positioned in an axial pilot bore 38 in the forward end of output shaft 22 and receives a necked down pilot portion 40 on the rearward end of input shaft 14. The forward end of output shaft 22 is splined to an axially extending cylindrical portion 42 of driven member 20. Support for driven member 20 and output shaft 22 is provided by a tapered roller bearing 44 having inner and outer races 46, 48 and a plurality of rollers 50. Bearing 44 may be supported in a housing assembly (not shown) in a well-known manner.

Spider assembly 16 includes a spider 52, a collar 54, and four beveled pinions 56 of which two are shown. Spider 52 has a hub portion 58 with a plurality of splines 60 which mate with a plurality of splines 62 formed on input shaft 14 and four radially extending pinion shafts 64 formed integrally with the hub. Two of the pinion shafts are shown. Pinions 56 are journaled on the pinion shafts and restrained from radially outward movement by collar 54. Collar 54 is composed of two rings which are bolted together in a conventional manner, (not shown). A thrust washer 66 is interposed between each pinion 56 and the collar.

Driven member 20 includes a beveled side gear portion 68 which is in constant mesh with pinions 56. Driven member 18 is a double gear and includes a hub portion 70 and a radially extending annular portion 72. Hub portion 70 is journaled on output shaft 14 via a sleeve bearing 73. A beveled side gear portion 74 is formed on the rearward end of hub portion 70. Beveled side gear 74 is in constant mesh with pinions 56. A spur gear or helical gear portion 76 is formed on the outer periphery of annular portion 72. A thrust washer 78 and a spacer 80 provide means for counteracting axial thrust imposed on driven member 20 and means for axially positioning the teeth of bevel gear 74 relative to the teeth of pinion 56.

Positive clutch assembly 24 includes a fixed annular member 82 and a movable annular member 83. A plurality of splines 84 formed on the inner circumference of annular member 82 are press-fitted over a plurality of mating splines 86 formed on input shaft 14. A washer 88, interposed between inner race 30 of bearing 28 and the forward end face 90 of annular member 82, provides an axial support to prevent forward-movement of the annular member should the mating splines loosen. The rearward end face 92 of annular member 82 is provided with three rivet-like elements 94 each of which has a shank 96 and button head 98. Shanks 96 are press-fitted into holes 100, which are spaced 120 degrees apart in the annular member.

Figure 3:
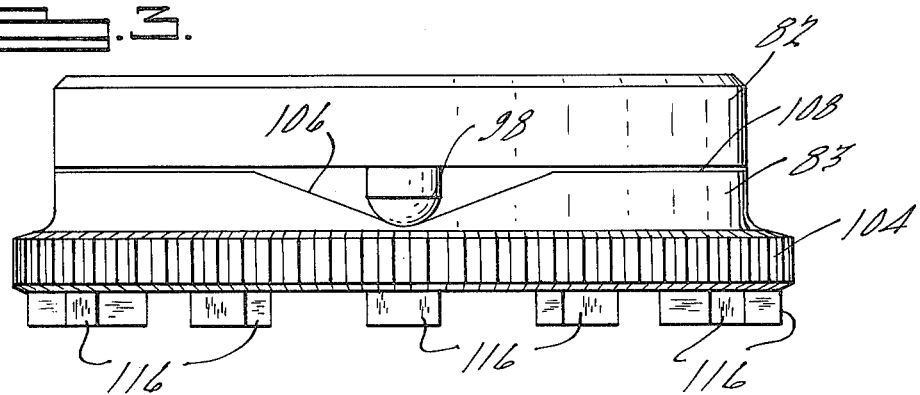

Referring now to FIGS. 1–3, movable member 83 includes a plurality of splines 102 formed on its inner circumference, a set of gear teeth 104 formed on its outer circumference, three veeramped depressions 106 formed in its forward end face 108, and an annular set of axially extending clutch teeth 110 projecting from its rear end face 112. Splines 102 are loosely received by splines 86 on input shaft 14 in a manner allowing axial and limited angular movement of annular member 83 relative to the input shaft 14, as best seen in FIG. 2. An annular wave spring 114, interposed between spacer 80 and rear end face 112, biases ramped depressions 106 into engagement with button heads 98. The axially extending cross section of each tooth of clutch teeth 110 is substantially a truncated sector of a circle defined at its radially inward and outward extents by concentric circles. Clutch teeth 110 are axially aligned and spaced from a similar mating annular set of axially extending clutch teeth 118 which are formed on the forward end face of annular portion 72. Button heads 98 coact with vee-ramped depressions 106 to provide a camming device to move clutch teeth 110 into engagement with clutch teeth 118 in response to angular phase changes between movable member 83 and input shaft 14.

Figure 5:
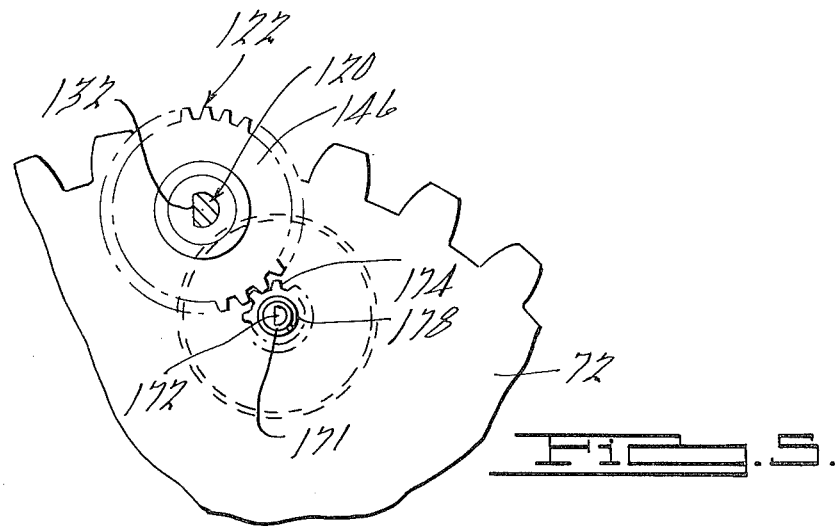
FIG. 5 is a cross-sectional view taken on line V—V of FIG. 4.

Acceleration responsive actuator assembly 26 is best seen in FIG. 4 and includes a drive shaft 120, a torque limiting clutch assembly 122 and a bob weight assembly 124. Drive shaft 120 is journaled in a bore 126 in annular portion 72 by a pair of needle bearing assemblies 128. A pinion 130 is formed on the forward end of shaft 120. Pinion 130 is in constant mesh with gear teeth 104 of annular member 83, as may be seen in FIG. 1. The portion of shaft 120 extending rearwardly beyond bore 126 has a flat 132 machined thereon, thereby giving the shaft somewhat of a D cross-sectional shape, as best seen in FIG. 5.

Torque limiting clutch assembly 122 is a double cone clutch having a pair of annular members 134, 136 defining on their outer periphery a pair of frusto-conical friction surfaces 138, 140 which mate with a pair of frusto-conical friction surfaces 142, 144 defined on the inner periphery of a gear 146. A thrust washer 148 having a D-shaped central opening fits snugly on the D shape of shaft 120 and rests against a shoulder 150, defined by the terminus of flat 132, to prevent axial movement of clutch assembly 122 in the forward direction. A D-shaped central opening in members 134, 136 provides means for freely sliding the members over the D-shaped portion of shaft 120 while preventing angular movement of the members relative to the shaft. Frusto-conical friction surface 138, 140 and 142, 144 are biased together by a helical spring 152 which is interposed between the rear end face of member 136 and a thrust washer 154. Axial movement of thrust washer 154 in the rearward direction is prevented by a snap ring 156.

A blind bore 158 in annular portion 72 and a press-fitted cap 160 at the open end of the bore, defines a cylindrical chamber 162 for enclosing bob weight assembly 124. Bob weight assembly 124 includes a bob weight 164 of substantially U-shaped axial cross section and a shaft 166. Bob weight 164 may be formed integrally with shaft 166 or press-fitted thereon. Shaft 166 is simply supported and journaled in a pair of needle bearing 167 which are supported by axially aligned bores 168, 170 in the end walls of chamber 162. A bore 169 provides a passage for draining oil from chamber 162. An end portion 171 of shaft 162 extends rearwardly beyond bore 168 and has a flat 172 machined thereon, thereby giving the shaft a D-shaped cross section, as best seen in FIG. 5. A pinion 174 has a D-shaped central opening, which fits the D shape of shaft portion 171 to prevent rotation of the pinion relative to the shaft. Axial movement of pinion 174 relative to shaft 166 is prevented by a shoulder 176, defined by the terminus of flat 172, and a snap ring 178.

OPERATION OF THE PREFERRED EMBODIMENT

The disclosed lock mechanism 12 is operative to lock input shaft 14 to driven member 18 when the relative acceleration between the input shaft and the driven member exceeds a predetermined level. Hence, the lock mechanism senses an incipient relative rotation between the input shaft and the driven member and locks the differential before significant levels of relative rotation occur.

The lock mechanism, as disclosed, includes positive clutch assembly 24 to lock the differential and acceleration responsive actuator assembly 26 which generates a force to engage the clutch assembly. Clutch assembly 24 is biased disengaged by spring 114 which tends to center button heads 98 in the apex of vee-ramped depressions 106, thereby tending to maintain the angular phase relationship between annular member 83 and input shaft 14. Acceleration responsive actuator assembly 26 is operative to engage the clutch by applying a force which tends to uncenter the ramped depressions 106, thereby tending to change the angular phase relationship between annular member 83 and input shaft 14. The clutch is engaged when the uncentering effect of the actuator force exceeds the effect of the spring biasing force.

The force (F) produced by actuator assembly 26 is a function of the acceleration acting on the actuator and the moment of inertia (I) of the actuator. Levels of relative acceleration which are capable of causing significant relative rotation are normally quite low. Therefore, to produce a force F great enough to engage the clutch the moment of inertia must be made large and/or the relative acceleration must be amplified; lock mechanism 12 contains means to do both. The moment of inertia of actuator assembly 26 is increased by bob weight assembly 124 and the relative acceleration acting on the actuator assembly is amplified by the ratio of gear teeth 104 and pinion 130 and the ratio of gear 146 and pinion 174.

The actuator force F is applied to annular member 83 at the mesh point of gear teeth 104 and pinion 130; this force is counter to the relative acceleration A between the input shaft and member 18, as shown in FIG. 2. Arrow A indicates a clockwise relative acceleration and arrow F the reactive force produced by the actuator.

Torque limiting clutch assembly 122 limits the magnitude of the force F produced by the actuator assembly. During some modes of operation of the differential relative acceleration levels may be great enough to cause damage to the actuator assembly. These relative accelerations may be tending to either increase or decrease the relative rotational speed between input shaft 14 and driven member 18. Relative accelerations tending to increase relative rotation is normally not great enough to generate large damaging forces. However, when the positive clutch is engaged, an instantaneous acceleration reversal occurs between the input shaft and the driven member; this reversed acceleration may be several orders of magnitude greater than the acceleration which caused the engagement of clutch assembly 24 and could generate damaging forces, were it not for the torque limiting clutch.

The preferred embodiment of the invention has been disclosed for illustrative purposes. The following claims are intended to cover the inventive portions of the preferred embodiment and variations or modification within the spirit of the invention.

What is claimed is:

1. An improved lock mechanism for a differential gear assembly of the type having an input member and two output members driven by said input member, said lock mechanism comprising:
   A. clutch means having
      1. a first position allowing differential rotation of said driving and driven members, and
      2. a second position restricting differential rotation of said driving and driven members, and
   B. actuator means including a mass accelerated in response to relative acceleration between any two of said members of said differential and said mass and acceleration produce a force proportional to said acceleration for moving said clutch to said second position with said proportional force when said proportional force exceeds a predetermined level.

2. The lock mechanism of claim 1 wherein:
   D. said actuator means further includes means for limiting said force produced by said relative acceleration.

3. The lock mechanism of claim 1 wherein:
   D. said mass is a rotatable mass carried by one of said members; and
   E. said lock mechanism includes means to drive said mass in response to relative rotation between said one member and another of said members.

4. The lock mechanism of claim 1 wherein:
   D. said mass is carried by one of said driven members and is rotatively driven in response to relative rotation between said one driven member and said driving member.

5. The lock mechanism of claim 3 wherein:
   F. said clutch includes gear means drivingly connecting said actuator means to said driving member.

6. The lock mechanism of claim 3 wherein:
   G. said mass is carried by one of said driven members; and
   H. said clutch includes gear means drivingly connecting said actuator means to said input member.

7. The lock mechanism of claim 3 wherein:
   F. said input member includes an input shaft;
   G. said one driven member is journaled on said input shaft and includes
      1. a radially extending annular portion, and
      2. a bore in said annular portion having an axis substantially parallel to and displaced from the central axis of said annular portion;
   H. said actuator means is journaled in said bore; and
   I. said clutch means includes
      1. a substantially annular member concentric to said input shaft and having
         a. means drivingly connecting said annular member to said input shaft and allowing axial and limited angular movement of said annular member relative to said input shaft, b. first clutching means adjacent to and axially aligned with an end face of said annular portion, and c. drive means on the exterior periphery of said annular member drivingly connecting said annular member to said actuator means;

2. second clutching means on said end face and axially aligned with said first clutching means, and 3. resilient means biasing said annular member axially away from said end face and tending to prevent angular rotation of said annular member relative to said input shaft.

8. The lock mechanism of claim 7 wherein:

J. said actuator means includes means for limiting said force produced by said relative acceleration.

9. The lock mechanism of claim 7 wherein:

J. said actuator means includes a shaft journaled in said bore and having 1. means drivingly connecting said shaft to said annular portion drive means, and 2. a mass of predetermined moment of inertia connected to said shaft.

10. The lock mechanism of claim 9 wherein:

K. said actuator means includes a torque limiting clutch connecting said mass to said shaft.

11. An improved lock mechanism for a differential gear assembly of the type having an input member driven by an input shaft and two output members driven by said input member, said lock mechanism comprising:

A. a shaft journaled in one of said differential gear members;

B. a mass of predetermined moment of inertia connected to said shaft;

C. drive means connecting said journaled shaft to another of said differential gear members so that said shaft is rotated in response to relative rotation between said one differential gear member and said other differential gear member and a force is generated at the point of driving connection of said shaft in response to relative acceleration between said one differential gear member and said other differential gear member; and D. means responsive to said force to restrict differential rotation of said differential gear members.

12. The lock mechanism of claim 11 wherein:

E. a torque limiting clutch drivingly connects said mass to said journaled shaft.

13. The lock mechanism of claim 12 wherein:

F. said responsive means includes a clutch having a substantially annular member driven by said input shaft; and G. said drive means includes 1. a set of gear teeth on the outer circumference of said annular member, and 2. a pinion on said shaft in mesh with said set of gear teeth.

14. The lock mechanism of claim 11 wherein:

E. one of said driven members includes an annular portion concentric to a portion of said input shaft;

F. said clutch means includes 1. first clutching means defined on an end face of said driven member annular portion, 2. a first substantially annular member a. fixed to and concentric to another portion of said input shaft, and b. defining cam means on an end face confronting said first clutching means, 3. a second substantially annular member a. concentric to said input shaft and interposed between said first clutching means and said first annular member cam means, b. defining cam means on an end face adjacent to and coacting with said first annular member cam means, c. defining clutching means on the other end face, d. defining gear teeth on the outer circumference, and e. means allowing axial and limited angular movement of said second annular member relative to said input shaft, and f. means resiliently biasing said second annular member cam means into coaction with said first annular member cam means;

G. said shaft is journaled in said annular portion; and

H. said drive means includes a pinion on said shaft and in mesh with said gear teeth on said second annular member.

15. The lock mechanism of claim 14 wherein:

I. said first and second clutching means are clutch teeth which when engaged provide a positive clutch.

16. The lock mechanism of claim 15 wherein:

J. a torque limiting clutch drivingly connects said mass to said shaft.

17. A differential gear assembly comprising:

A. an input gear;

B. an input shaft driving said input member;

C. two output gears driven by said input member, one of said driven gears being journaled on said input shaft and defining an annular end face;

D. a substantially annular clutch member 1. mounted on said input shaft in confronting relation to the annular end face in a manner allowing axial and limited angular movement thereof relative to said input shaft, 2. having gear teeth formed on the exterior periphery thereof, and 3. defining annular first clutching means on the annular end face thereof confronting the annular end face of said one driven gear;

E. second annular clutching means on the annular end face of said one driven gear;

F. means biasing said clutch member away from said one driven gear;

G. cam means operative in response to angular movement of said clutch member relative to said input shaft to move said clutch member axially along said input shaft for engagement of said first and second clutching means; and H. an actuator assembly including 1. a shaft journaled in said driven gear radially outwardly of said second annular clutching means, 2. a mass of predetermined moment of inertia connected to said journaled shaft, and 3. a pinion on one end of said journaled shaft and in mesh with said clutch member gear teeth, whereby said journaled shaft is rotated about its axis in response to a predetermined rotational relationship between said input shaft and said one driven gear to apply a retarding force to said clutch member to move said clutch member angularly relative to said input shaft and cam the clutch member into clutching engagement.

18. The differential of claim 17 wherein:

I. said pinion and clutch member gear teeth define an amplifying gear ratio for rotating said journaled shaft faster than said input shaft.

19. The differential of claim 18 wherein:

J. said actuator assembly includes a torque limiting clutch for connecting said mass to said journaled shaft.

20. The differential of claim 18 wherein:

J. said first and second clutching means have mating clutch teeth which cooperate to define a positive clutch for locking said one driven gear to said input shaft.

21. The differential of claim 18 wherein:

J. said first and second clutching means have mating clutch teeth which cooperate to define a positive clutch for locking said one drive member to said input shaft; and K. said actuator assembly includes a torque limiting clutch for connecting said mass to said journaled shaft.

* * * * *

UNITED STATES PATENT AND TRADEMARK OFFICE
CERTIFICATE OF CORRECTION

PATENT NO. : 3,915,032
DATED : October 28, 1975
INVENTOR(S) : Wm. C. Ottemann

It is certified that error appears in the above—identified patent and that said Letters Patent are hereby corrected as shown below:

Col. 1, line 41: "axial" should read "axle".

Signed and Sealed this second Day of March 1976

[SEAL]

Attest:

RUTH C. MASON
*Attesting Officer*

C. MARSHALL DANN
*Commissioner of Patents and Trademarks*